Figure 1:
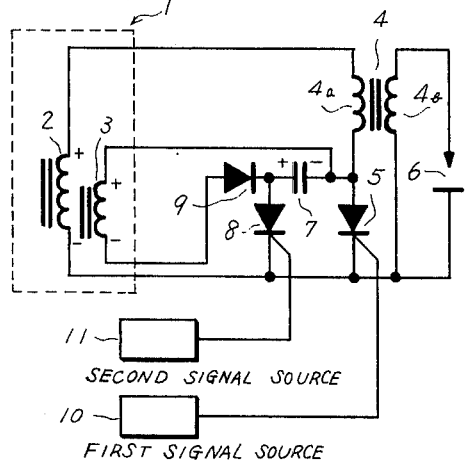

SECOND SIGNAL SOURCE

FIRST SIGNAL SOURCE

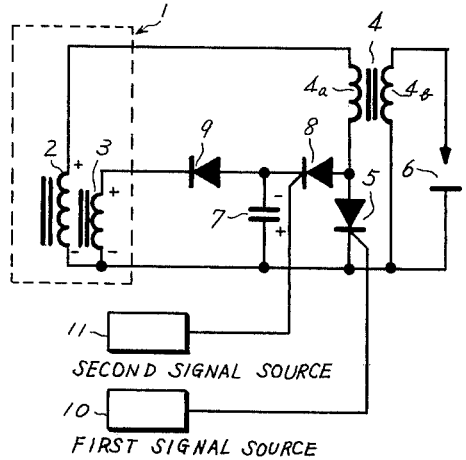
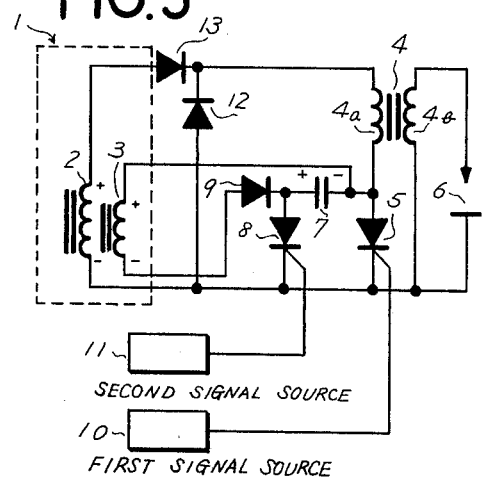
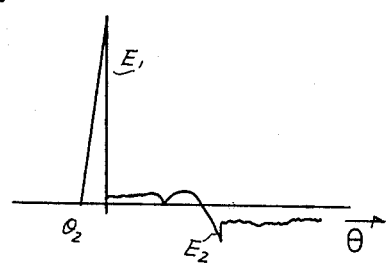
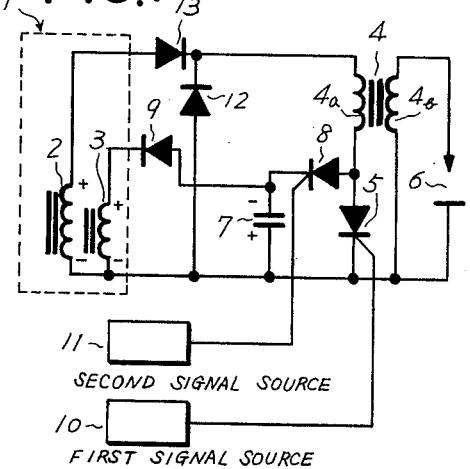
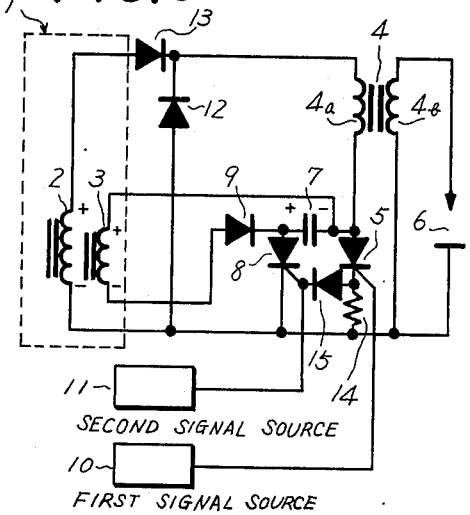
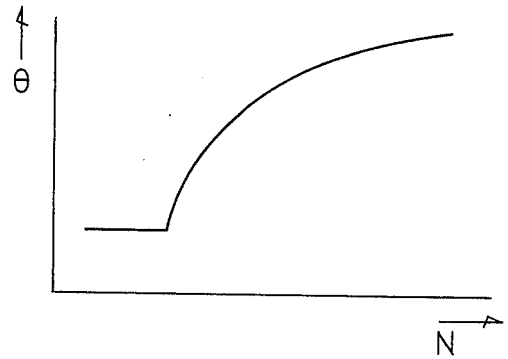

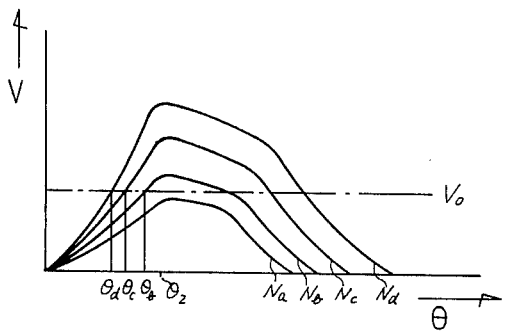
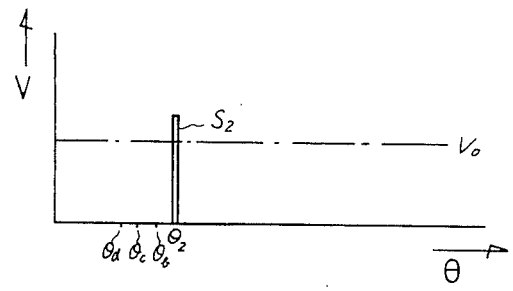
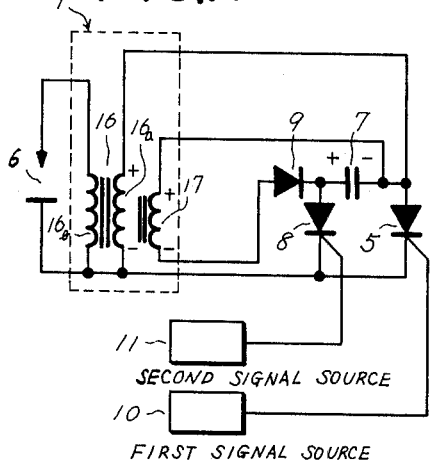
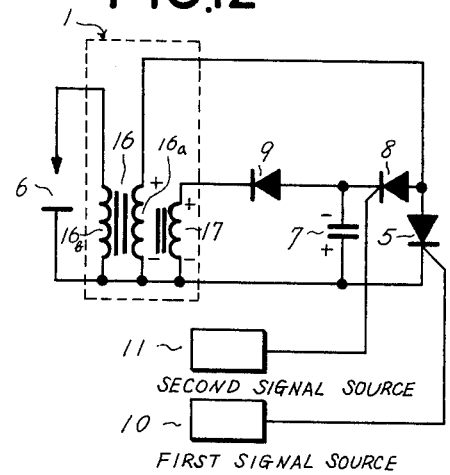
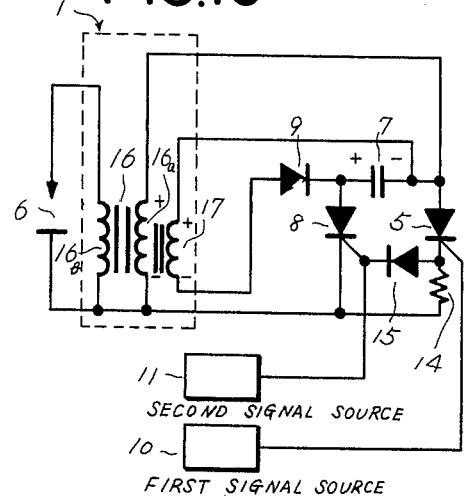

IGNITION SYSTEM FOR AN INTERNAL COMBUSTION ENGINE

BACKGROUND OF THE INVENTION

The present invention relates to an ignition system for an internal combustion engine.

A conventional ignition system as is disclosed in U.S. Pat. No. 3,424,944 filed Nov. 9, 1966 comprises a first thyristor connected in series with the primary winding of an ignition coil, a second thyristor having the cathode thereof connected to the cathode of the first thyristor and a capacitor coupling the anodes of the first and second thyristors. A DC power source supplies a DC current at a constant voltage. The first thyristor is turned on in advance of the ignition timing of the engine. The current through the primary winding is established. Meantime, the capacitor is charged through a path including the first thyristor. At the ignition timing, the second thyristor is turned on and the capacitor is discharged through the second thyristor to apply a reverse voltage across the anode and cathode of the first thyristor, so that the first thyristor is turned off. The turn-off of the first thyristor leads to sudden decrease of the primary current, which in turn causes generation of a high voltage in the secondary winding.

It is first noted that this conventional ignition system is intended to be used in an engine provided with a DC power source of constant voltage such as batteries and does not operate in an engine which is provided with an AC generator instead of batteries.

Secondly, as the output voltage from the DC power source is constant the voltage applied to the primary winding is constant regardless of the engine speed. Inductance and resistance of the primary winding and of any element in series circuit with the primary winding as well as the voltage applied to the primary winding determine the length of time required for the primary current to be established, or in other words, to reach a value sufficient to cause, when suddenly reduced to nil, a high voltage in the secondary winding. Since the inductance, the resistance and the voltage applied are all constant in this conventional system, the time required for establishing the primary current is constant regardless of the engine speed. On the other hand, the time required for one cycle of operation becomes shorter as the engine speed increases. As a result, at engine speeds which are too high for the primary current to be fully established, a voltage generated in the secondary winding is insufficient. This means that the engine speed may be limited by the factors of the resistance and the inductance as well as the voltage.

Another factor that may limit the engine speed is the time required for charging the capacitor. The capacitor has to be charged to a voltage which is sufficient to turn off the first thyristor when the capacitor is subsequently discharged through the second thyristor to apply a reverse voltage across the anode and cathode of the first thyristor. In this conventional system, the capacitor is charged by an oscillator and this charging begins when the first thyristor conducts. Output voltage of the oscillator is constant and therefore the time required for completing the charging is constant regardless of the engine speed. As the engine speed becomes so high that time allotted for the full charging of the capacitor is insufficient, the first thyristor is not turned off by the reverse voltage from the capacitor which is not sufficient with the result that the primary current is not interrupted, and ignition of the engine does not take place. Consequently, this may limit the engine speed.

Also as the ignition angle advances with increasing engine speed, the time allowed for establishing the primary current and for charging the capacitor becomes shorter because not only of the decreasing period of one cycle which is inversely proportional to the engine speed, but also of advancing engine speed where some means for automatically advancing the ignition angle is incorporated as is often desired. This may further limit the engine speed.

Summary of the Invention

An object of the present invention is to provide an ignition system for an internal combustion engine having an AC generator rotating in synchronism with the engine and particularly an ignition system in which a current through the primary winding of an ignition coil is suddenly changed, without failure at various engine speeds, to induce a high voltage in the secondary winding.

Another object of the present invention is to provide an ignition system in which the voltage applied to the primary winding of an ignition coil increases as the engine speed increases, and therefore the current through the primary winding is established within a period of time which becomes shorter with increasing enging speed, so as not to set an upper limit to the engine speed.

Another object of the present invention is to provide an ignition system in which the voltage used for charging the capacitor increases as the engine speed increases, and therefore the charging is completed within a period of time which becomes shorter with increasing engine speed, so as not to limit the engine speed.

Another object of the present invenion is to enhance the spark energy at the ignition plug in an ignition system by superimposing a spark due to a capacitor discharge and a spark due to interruption of the primary current.

Still another object of the invention is to provide an ignition system in which the timing or angle at which ignition occurs advances as the engine speed increases.

An ignition system of the present invention comprises an ignition coil having a primary winding and a secondary winding. An ignition plug is connected across the secondary winding. The ignition system further comprises a first thyristor connected in series with the primary winding to control a current through the primary winding. In an embodiment of the present invention, the primary winding of the ignition coil is energized by a first armature winding disposed in the AC generator. In another embodiment, the ignition coil is disposed in the generator to generate electricity for itself.

The ignition system further comprises a second thyristor and a second armature winding disposed in the AC generator. A capacitor is connected through a diode across the output terminals of the second armature winding. A first signal source is adapted to supply a first trigger signal to the gate of said first thyristor at a first angle in advance of the ignition timing or angle of the engine. A second thyristor source is also adapted to supply a second trigger signal to the gate of the second thyristor at a second angle. The first and second trigger signal may respectively be produced at fixed first and stantially I-shaped armature core or on one of radially outwardly extending portions of a substantially star-shaped core disposed inside an AC generator rotating in synchronism with the engine to cooperate with the magnets of the generator, and means for producing a trigger pulse at a rotational angle when the output voltage of the signal generating coil reaches a predetermined value. In this case, the angle at which the output voltage reaches a predetermined value more or less advances as the engine speed increases since the peak value as well as the rate of rise of the output signal increases with engine seed. Automatic advance of ignition angle is at least to some extent effected without resorting to any further arrangement.

Figure 2A:
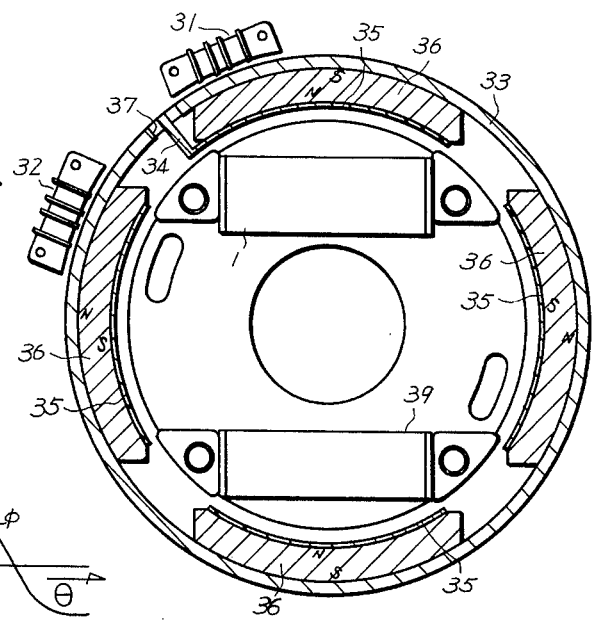
Figure 2B:
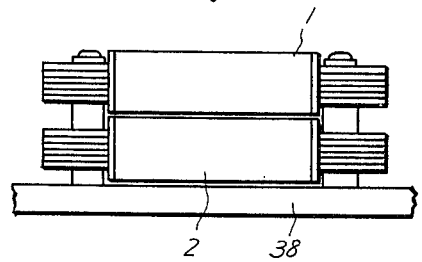

Alternatively, where a flywheel magneto generator, such as shown in FIGS. 2A and 2B is employed, each of signal sources 10 and 11 may comprise a signal generator 31 or 32 which is positioned outside and close to the flywheel 33 of the flywheel magneto generator and produces a trigger pulse when a portion 34 extending from a pole piece 35 on one of the magnets 36 mounted inside flywheel 33 through an opening 37 provided in flywheel 33 approaches and passes opposite to signal generator 31 or 32 as flywheel 33 rotates. In this case, trigger pulses are produced at substantially fixed angles regardless of the engine speed, so that some means for advancing the ignition angle has to be added where advance of ignition angle is desired.

In either case, signal sources 10 and 11 are so designed, or the signal generating coils are so positioned that a first trigger signal is produced nearly at the beginning of a half cycle when first armature winding 2 produces an output of a polarity as indicated in FIG. 1 and a second trigger signal is produced at an angle when the current through the primary winding 4a of ignition coil 4 is nearly at its peak value.

FIG. 2A together with FIG. 2B also show, by way of example, how first and second armature windings 1 and 2 may be mounted where above-mentioned flywheel magneto generator is employed. Designated by numeral 38 is a fixed plate to which first and second armature windings 1 and 2 wounded on substantially I-shaped cores are fixed. A generating winding 39 which energizes head lights and the like is also mounted, spaced from armature windings 1 and 2 by 180°.

Figure 3A:
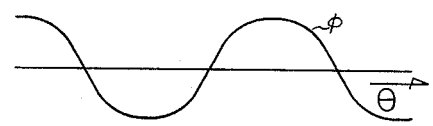
Figure 3B:
Figure 3C:
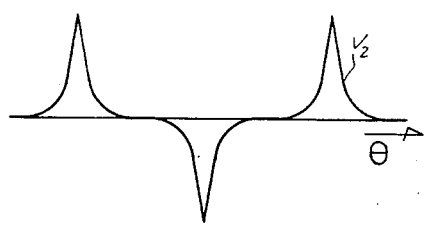
Figure 3D:
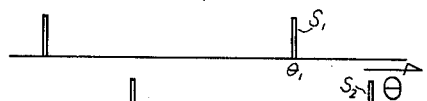
Figure 3E:
Figure 3F:
Figure 3G:
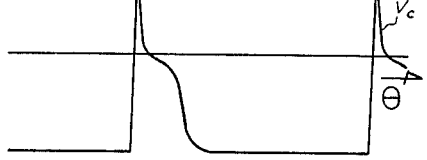
Figure 3H:
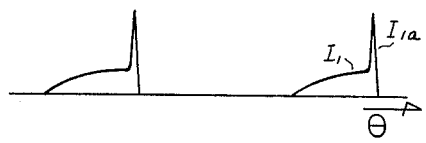

Operation of the above embodiment is now described with reference to FIGS. 3A through 3G, which show waveforms of voltage or current at various portions of the system against rotational angle $\theta$ of generator 1. FIGS. 3A, 3B and 3C respectively show variations of a magnetic flux $\phi$, a no-load voltage $V_1$ of first armature winding 2 and a no-load voltage $V_2$ of second armature winding 3. FIGS. 3D and 3E respectively show a first and second trigger signals $S_1$ and $S_2$ produced by first and second signal sources 10 and 11. FIGS. 3F and 3G respectively show the current $I_1$ through primary winding 4a and voltage Vc across capacitor 7. FIG. 3H will be referred to later.

As already mentioned, generator 1 rotates in synchronism with the engine. During a half cycle when second armature winding 3 produces an output of a polarity opposite to that shown in FIG. 1, capacitor 7 is charged into a polarity as shown in FIG. 1 by the output of second armature winding 3 through diode 9. During the next half cycle, when first armature winding 2 produces an output of a polarity as shown in FIG. 1, first signal source 10 supplies a first trigger signal $S_1$ to the gate of first thyristor 5 at a first angle $\theta_1$ close to the beginning of the half cycle, so that first thyristor 5 is turned on and the current $I_1$ through the primary winding begins to flow.

Thereafter, at a second angle $\theta_2$ at which the primary current $I_1$ is approximately at its peak value, second signal source 11 supplies a second trigger signal $S_2$ to the gate of second thyristor 8. Since second thyristor 8 is forward-biased by the voltage across capacitor 7, second thyristor 8 becomes conductive upon receipt of second trigger signal $S_2$. As second thyristor 8 conducts, the voltage built up on capacitor 7 is applied in a reverse direction across the anode and cathode of first thyristor 5, so that first thyristor 5 is turned off. Capacitor 7 is discharged through a path including second thyristor 8, first armature winding 2 and primary winding 4a of ignition coil 4, and is subsequently charged into a polarity opposite to that shown in FIG. 1. When the charging of capacitor 7 into such opposite polarity is completed, second thyristor 8 turns off. The result is that the current through the primary winding 4a drops to nil within a time as short as a few tens of microsecond, so that a high voltage is induced in the second winding 4b and thereby plug 6 is fired. Thus, by setting the timing of occurrence of second trigger signal $S_2$ at the ignition angle (precisely speaking, a little before it allowing for the time required for the discharge and subsequent charge of capacitor 7), ignition of the engine is appropriately timed.

According to the embodiment described above, first armature winding 2 disposed in AC generator 1 rotating in synchronism with the engine supplies a current to primary winding 4a, so that the current is established within a period of time which becomes shorter with increasing engine speed. Accordingly, the engine speed is not limited by such time required for establishing the primary current. Also, capacitor 7 is charged by an output from second armature winding 3 disposed in AC generator 1 within a period of time which becomes shorter with increasing engine speed, so that the engine speed is not limited by such time required for charging capacitor 7.

FIG. 4 shows another embodiment of an ignition system according to the present invention. In this embodiment, the anodes of first and second thyristors 5 and 8 are connected to each other and capacitor 7 is connected between the cathodes of thyristors 5 and 8. The rest of connections and the operation of the embodiment are substantially identical to those described about the embodiment of FIG. 1.

FIG. 5 shows still another embodiment of the present invention. Connections of this embodiment is substantially identical to those in FIG. 1 except that a diode 12 is connected across a series circuit formed of primary winding 4a of ignition coil 4, capacitor 7 and second thyristor 8. More particularly, the anode of diode 12 is connected to the cathode of thyristor 8 and the cathode of diode 12 is connected to an end of primary winding 4a. A diode 13 is inserted between an end of first armature winding 2 and the cathode of diode 12 to prevent a short-circuit current to flow during half cycles when an output voltage of first armature 2 is in a polarity opposite to that shown in FIG. 5.

Effect of the incorporation of diode 12 is that a discharge current from capacitor 7 upon conduction of thyristor 8 flows through second thyristor 8, diode 12 and primary winding 4a of ignition coil 4. Because this discharge current flows through a path excluding first armature winding 2, the peak value of the current and the rate of rise of the current is, as shown in FIG. 3H, larger than those obtained in the case of the embodiment of FIG. 1. Consequently, a high voltage is generated in secondary winding 4b of ignition coil 4 when the discharge current flows through primary winding 4a, prior to generation of a high voltage due to subsequent interruption of the primary current. Polarity of the secondary voltage indicated by $E_1$ in FIG. 6 due to the rise of the discharge current is opposite to that of the secondary voltage indicated by $E_2$ due to the drop or interruption of the current. Accordingly, plug 6 sparks in one polarity and then in the opposite polarity. The total spark energy is larger than that obtained where only a spark due to the interruption of the primary current is utilized. As is known in the art, enhancement of the spark energy is one of the desiderata in view of prevention of environmental polution.

FIG. 7 shows another embodiment of the present invention. Connections of this embodiment are substantially identical to those in FIG. 5 except that the anodes of first and second thyristors 5 and 8 are connected to each other and capacitor 7 is connected between the cathodes of thyristors 5 and 8. The operation of this embodiment is substantially identical to that of the embodiment of FIG. 5.

The various embodiments described hereinbefore either employ signal sources which supply trigger signals at fixed angles, or alternatively rely on signal sources whose output trigger signals are produced at more advanced angles with increasing engine speed. The latter signal sources, such as those disposed inside an AC generator, are not always available, because the space inside an AC generator is limited.

It is therefore desired that an arrangement for automatically advancing the ignition angle and for preventing failure of ignition at low engine speeds by provided in an ignition circuit other than the signal sources themselves.

FIG. 8 shows an embodiment of the present invention satisfying such requirement. Connections of this embodiment are substantially identical to those in FIG. 5 except that a resistor 14 is connected in series with first thyristor 5 and both ends of resistor 14 is connected through a diode 15 across the gate and cathode of second thyristor 8, so that the voltage across resistor 14 is applied to the gate of second thyristor 8.

As described earlier, the output voltage from first armature winding 2 increases with the engine speed. Accordingly, the voltage Vr across resistor 14 which is proportional to the current through the primary winding 4a and through resistor 14 itself changes taking waveforms as shown in FIG. 9A for various engine speed Na, Nb, Nc and Nd (Na<Nb<Nc<Nd), supposing first thyristor 5 is turned on at angle $\theta_1$ and is not turned off until the current through the primary winding naturally falls to nil.

While the engine sped is at Na, voltage Vr is slow to rise and is not large enough to reach the trigger level Vt of second thyristor 8. So, second thyristor 8 is turned on upon receipt of second trigger signal $S_2$ as shown in FIG. 9B from second signal source 11 at angle $\theta_2$. As the engine speed increases, voltage Vr become rapid to rise and becomes larger, and therefore becomes to reach trigger level Vo, at angle $\theta b$ for engine speed Nb, at $\theta c$ for Nc and at $\theta d$ for Nd.

Thus, the ignition system can be so designed that as the engine speed exceeds a predetermined value second thyristor 8 is triggered by voltage Vr cross resistor 14 before second signal source 11 supplies second trigger signal $S_2$, and thereby the angle at which ignition takes place advances with increasing engine speed, while at speeds below the predetermined value second thyristor 8 is turned on by second trigger signal $S_2$ at a fixed angle $\theta_2$. Consequently, angle of advance varies with engine speed N as shown in FIG. 10.

The embodiments described hereinbefore include an ignition coil and a separate first armature winding. However, it is also possible to dispose the primary winding of an ignition coil in an AC generator and have it generate electricity for itself as, for example, is shown in FIG. 11. In this embodiment, an ignition system comprises an ignition coil 16 having a primary winding 16a and a secondary winding 16b. Primary winding 16a is disposed in generator 1. Secondary winding 16b is magnetically coupled to primary winding 16a. A second armature winding 17 similar to second armature winding 3 in FIG. 1 is also disposed in generator 1 to provide an output to charge capacitor 7 through diode 9. First thyristor 5 is connected to the ends of primary winding 16a of ignition coil 16. The rest of connections are substantially identical to those in FIG. 1.

When first thyristor conducts a short-circuit current flows through thyristor 5. When second thyristor 8 conducts capacitor 7 which has been charged by second armature winding 17 is discharged through primary winding 16a to induce a high voltage in secondary winding 16b. Also, when capacitor 7 is discharged first thyristor 5 is turned off, leading upon completion of the discharge to interruption of the current through primary winding 16a and therefore generation of a high voltage in secondary winding 16b.

FIG. 12 shows a further embodiment of the present invention. Connections of this embodiment are substantially identical to those in FIG. 11 except that the anodes of first and second thyristors 5 and 8 are connected to each other and capacitor 7 is connected between the cathodes of thyristors 5 and 8. The operation of this embodiment is substantially identical to that of the embodiment of FIG. 11.

FIG. 13 shows a still further embodiment of the present invention. Connections of this embodiment are substantially identical to those in FIG. 11 except that a resistor 14 is connected in series with first thyristor 5 and both ends of resistor 14 is connected through a diode across the gate and cathode of second thyristor 8, so that the voltage across resistor 14 is applied to the gate of second thyristor 8.

As will be apparent from the description made with reference to FIG. 8, second thyristor 8 is triggered by the voltage across resistor 14 before second signal source 11 supplies second trigger signal $S_2$ as the engine speed exceeds a predetermined valve, while at speeds below the predetermined value second thyristor 8 is turned on by second trigger signal $S_2$ at fixed angle $\theta_2$, thereby enabling advance of ignition angle.

The sequence of operation after second thyristor 8 is turned on are substantially identical to that of the embodiment of FIG. 11.

Although capacitor 7 has been described as being charged during a half cycle when the polarity of the output voltage from the second armature is opposite to that shown in the various circuit diagrams, it is also possible to connect the capacitor so as to achieve the charging during a half cycle when the polarity of the output voltage from the second armature winding is as shown in the circuit diagrams.

While there have been described what are at present considered to be the preferred embodiments of this invention, it will be obvious to those skilled in the art that various changes and modifications may be made therein without departing from the invention, and it is aimed, therefore, in the appended claims to cover all such changes and modifications as fall within the true spirit and scope of the invention.

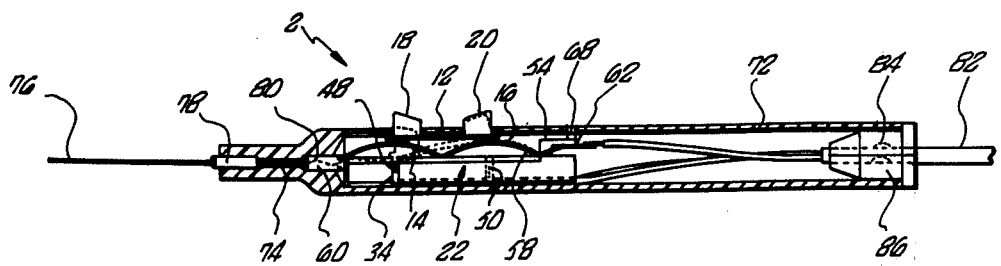

What is claimed is:

1. An ignition system for an internal combustion engine having an AC generator rotating in synchronism with the engine, said ignition system comprising; an ignition coil having a primary winding and a secondary winding, an ignition plug connected across said secondary winding of said ignition coil, a first armature winding disposed in the generator to supply a current to said primary winding of said ignition coil, a first thyristor connected in series with said primary winding of said ignition coil to control the current through said primary winding, a second thyristor, a second armature winding disposed in the generator, a capacitor connected through a diode across said second armature winding, a first signal source to supply a first trigger signal to the gate of said first thyristor at a first angle, and a second signal source to supply a second trigger signal to the gate of said second thyristor at a second angle, said capacitor being further connected to apply a reverse voltage across the anode and cathode of said first thyristor when said second thyristor conducts, so that said first thyristor is turned off, whereby interruption of the current through said primary winding of said ignition coil induces a high volage in said secondary winding of said ignition coil.

2. An ignition system as set forth in claim 1, wherein said primary winding of said ignition coil is connected through said first thyristor to the output terminals of said first armature winding and said capacitor is connected through said second thyristor across the anode and cathode of said first thyristor.

3. An ignition system as set forth in claim 2, further comprising a diode across a series circuit formed of said primary winding of said ignition coil, said capacitor and said second thyristor to allow a discharge current of said capacitor to flow through a path including said diode and said primary winding, whereby the discharge current through said primary winding of said ignition coil induces a high voltage in said secondary winding prior to the induction of a high voltage due to the interruption of the current through said primary winding.

4. An ignition system as set forth in claim 1, further comprising a resisitor connected in series with said first thyristor, both ends of said resistor being connected through a diode across the gate and cathode of said second thyristor, wherein as the rotational speed of the engine exceeds a predetermined value the voltage across said resistor reaches the trigger level of said second thyristor before said second signal source supplies the second trigger signal to said second thyristor.

5. An ignition system for an internal combustion engine having an AC generator rotating in synchronism with the engine, said ignition system comprising; an ignition coil having a primary winding and a secondary winding, said primary winding being disposed in the generator to provide a current and said secondary winding being magnetically coupled to said primary winding, an ignition plug connected across said secondary winding of said ignition coil, a first thyristor having the anode and cathode connected across said primary winding of said ignition coil, a second thyristor, a second armature winding disposed in the generator, a capacitor connected through a diode across said second armature winding, a first signal source to supply a first trigger signal to the gate of said first thyristor at a first angle, a second signal source to supply a second trigger signal to the gate of said second thyristor at a second angle, said capacitor being further connected through said second thyristor across the anode and cathode of said first thyristor to apply a reverse voltage across the anode and cathode of said first thyristor when said second thyristor conducts, so that said first thyristor is turned off.

6. An ignition system as set forth in claim 5, further comprising a resistor connected in series with said first thyristor, both ends of said resistor being connected through a diode across the gate and cathode of said second thyristor, wherein as the rotational speed of the engine exceeds a predetermined value the voltage across said resistor reaches the trigger level of said second thyristor before said second signal source supplies the second trigger signal to said second thyristor.

* * * * *

United States Patent [19]

Prater et al.

[11] 4,034,761
[45] July 12, 1977

[54] DISPOSABLE ELECTROSURGICAL SWITCHING ASSEMBLY

[75] Inventors: Earle F. Prater, Long Beach; Frank L. Poole, Sante Fe Springs, both of Calif.

[73] Assignee: The Birtcher Corporation, Los Angeles, Calif.

[21] Appl. No.: 640,739

[22] Filed: Dec. 15, 1975

[51] Int. Cl.² .................. A61B 17/36; A61N 3/06; H01H 9/06; H01H 11/00
[52] U.S. Cl. .................. 128/303.14; 128/303.17; 200/6 C; 200/153 K; 200/157; 29/622; 339/256 SP; 339/258 S
[58] Field of Search ............... 128/303.13, 303.14, 128/303.17, 303.15, 303.18, 405; 339/256 SP, 258 S; 200/157, 6 BA, 6 BB, 6 C, 61.85, 153 K; 29/622

[56] References Cited

U.S. PATENT DOCUMENTS

| | | | |
|---|---|---|---|
| 3,511,951 | 2/1970 | Miller | 200/157 |
| 3,532,095 | 10/1970 | Miller et al. | 128/303.13 |
| 3,691,324 | 9/1972 | Brantingson | 200/6 C X |
| 3,720,896 | 3/1973 | Beierlein | 128/303.13 X |
| 3,801,766 | 4/1974 | Morrison, Jr. | 128/303.14 X |
| 3,807,404 | 4/1974 | Weissman et al. | 128/303.14 |
| 3,875,945 | 4/1975 | Friedman | 128/303.14 |
| 3,911,241 | 10/1975 | Jarrard | 128/303.17 |
| 3,929,137 | 12/1975 | Gonser | 128/303.14 |

FOREIGN PATENT DOCUMENTS

| | | | |
|---|---|---|---|
| 811,682 | 4/1937 | France | 128/303.14 |
| 1,184,311 | 7/1959 | France | 339/258 S |
| 1,166,130 | 10/1969 | United Kingdom | 339/256 SP |

*Primary Examiner*—Kyle L. Howell
*Assistant Examiner*—Lee S. Cohen
*Attorney, Agent, or Firm*—Jackson & Jones

[57] ABSTRACT

A disposable electrosurgical unit for generating electrical signals intended for applications to the body of a patient via an electrosurgical electrode is provided. Cutting signals and coagulation signals can be applied by the actuation of a switch in the handle supporting a removable blade electrode. The electrode blade has a mounting end configuration that can be removably mounted in a receptacle portion of a resilient conductive member. The conductive member is biased by its particular bowed shape and mounting configuration away from wire wrap contacts connected to a power generator source. The switching member is mounted in the electrode handle for selectively moving one of the bowed portions of the resilient conductive member into contact with a wire wrap contact for actuation of the electrode blade in a desired operative mode.

22 Claims, 4 Drawing Figures